United States Patent
Casey

(10) Patent No.: US 6,893,160 B2
(45) Date of Patent: May 17, 2005

(54) BEARING ASSEMBLY

(75) Inventor: Marlon R. Casey, Indianapolis, IN (US)

(73) Assignee: Rexnord Industries, Inc., Milwaukee, WI (US)

(*) Notice: Subject to any disclaimer, the term of this patent is extended or adjusted under 35 U.S.C. 154(b) by 23 days.

(21) Appl. No.: 10/659,204

(22) Filed: Sep. 10, 2003

(65) Prior Publication Data

US 2005/0053318 A1 Mar. 10, 2005

(51) Int. Cl.[7] ............................................. F16C 19/06
(52) U.S. Cl. ...................................... 384/538; 384/540
(58) Field of Search ................................ 384/538, 540, 384/541, 542, 585

(56) References Cited

U.S. PATENT DOCUMENTS

| | | |
|---|---|---|
| 718,727 A | 1/1903 | Potstada |
| 1,957,062 A | 5/1934 | Graham et al. |
| 2,043,272 A | 6/1936 | Wallgren |
| 2,045,896 A | 6/1936 | Brusca |
| 2,213,400 A | 9/1940 | Laughridge |
| 2,970,018 A | 1/1961 | Ruttgers |
| 3,276,828 A | 10/1966 | Mansfield |
| 3,807,820 A | 4/1974 | Schuhmann |
| 3,953,142 A | 4/1976 | Price et al. |
| 4,240,677 A | 12/1980 | Payne et al. |
| 4,893,948 A | 1/1990 | Hoch |
| 5,153,990 A | 10/1992 | Martinie |
| 5,417,500 A | 5/1995 | Martinie |
| 5,489,156 A | 2/1996 | Martinie |
| 5,709,483 A | 1/1998 | Martinie |
| 5,863,137 A | 1/1999 | Johnson |
| 5,876,127 A | 3/1999 | Casey |
| 5,897,214 A | 4/1999 | Nisley |
| 6,129,456 A | 10/2000 | Okamoto |
| 6,200,039 B1 | 3/2001 | Johnson |
| 6,336,748 B2 | 1/2002 | Johnson |
| 6,425,690 B1 | 7/2002 | DeWachter |

*Primary Examiner*—Lenard A Footland
(74) *Attorney, Agent, or Firm*—Quarles & Brady LLP

(57) ABSTRACT

A wedge-type bearing assembly that is easily dismounted from a shaft includes an adapter sleeve, an inner ring, and a lock nut. The split cylindrical adapter sleeve wraps around a shaft, and has a radially outwardly facing surface including a tapered section. The threaded inner ring encircles the adapter sleeve, and includes a radially inwardly facing surface engaging the tapered section of the adapter sleeve. The lock nut is fixed axially relative to said the sleeve and threadably engages the inner ring, wherein rotation of the lock nut in one direction of rotation draws the inner ring over the adapter sleeve to fix the inner bearing ring relative to the shaft, and rotation of the lock nut in a second direction urges the inner ring off of the adapter sleeve to release the inner bearing ring relative to the shaft.

20 Claims, 4 Drawing Sheets

BEARING ASSEMBLY

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The field of invention is bearings, and more particularly, to a shaft mounted wedge-type bearing assembly.

It is generally known to mount bearing assemblies on a shaft through the use of set screws or eccentric collars which lock the inner ring of the bearing assembly to the shaft. In such designs, the inner ring of the bearing assembly extends longitudinally along the shaft and is incorporated in the mechanisms for sealing the inner ring against the shaft and for locking the bearing assembly on the shaft.

It is also known to provide a bearing assembly with an inner ring which has extending therethrough a tapered bore and which loosely surrounds the shaft. Such bearing assembly designs also include a cylindrical wedge or tapered mounting adapter sleeve that is also placed over the shaft. The sleeve has therein a longitudinally extending slit which allows the sleeve to be placed over the shaft but affords compression or squeezing the sleeve into frictional engagement with the shaft. The sleeve is pulled into engagement with the tapered bore in the inner ring of the bearing assembly. The wedge-like engagement between the tapered sleeve and the tapered bore creates an interference fit between the sleeve and the inner ring, and compresses the sleeve into locked engagement with the shaft. The locked engagement between the inner ring and the sleeve, and between the sleeve and the shaft thereby fixes the inner ring relative to the shaft.

The use of a tapered sleeve in conjunction with a tapered inner ring to mount a bearing assembly on a shaft is advantageous in that this type of bearing assembly mounting accommodates shafts which may have a circumference differing from a nominal specified circumference. These wedge-type bearing assemblies, however, are much more difficult to remove from a shaft compared to the bearing assemblies fixed to a shaft using set screws or eccentric collars. Therefore, a need exists for a shaft mounted wedge-type bearing assembly that is easily dismounted from the shaft.

BRIEF SUMMARY OF THE INVENTION

The present invention provides a wedge-type bearing assembly including an adapter sleeve, an inner ring, and a lock nut that is easily dismounted from a shaft. The split cylindrical adapter sleeve wraps around a shaft, and has a radially outwardly facing surface including a tapered section. The threaded inner ring encircles the adapter sleeve, and includes a radially inwardly facing surface engaging the tapered section of the adapter sleeve. The lock nut is fixed axially relative to said the sleeve and threadably engages the inner ring, wherein rotation of the lock nut in one direction of rotation draws the inner ring over the adapter sleeve to fix the inner bearing ring relative to the shaft, and rotation of the lock nut in a second direction urges the inner ring off of the adapter sleeve to release the inner bearing ring relative to the shaft.

A general objective of the present application is to provide a shaft mounted bearing assembly that is easy to mount and dismount from a shaft. The present invention accomplishes this objective by providing the shaft mounted bearing assembly with a lock nut that is axially fixed relative to the adapter sleeve and threadably engages the inner ring, wherein rotation of the lock nut in one direction of rotation draws the inner ring over the adapter sleeve to compress the adapter sleeve and fix the inner bearing ring relative to the shaft, and rotation of the lock nut in a second direction urges the inner ring off of the adapter sleeve to allow expansion of the adapter sleeve and release the inner bearing ring relative to the shaft.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
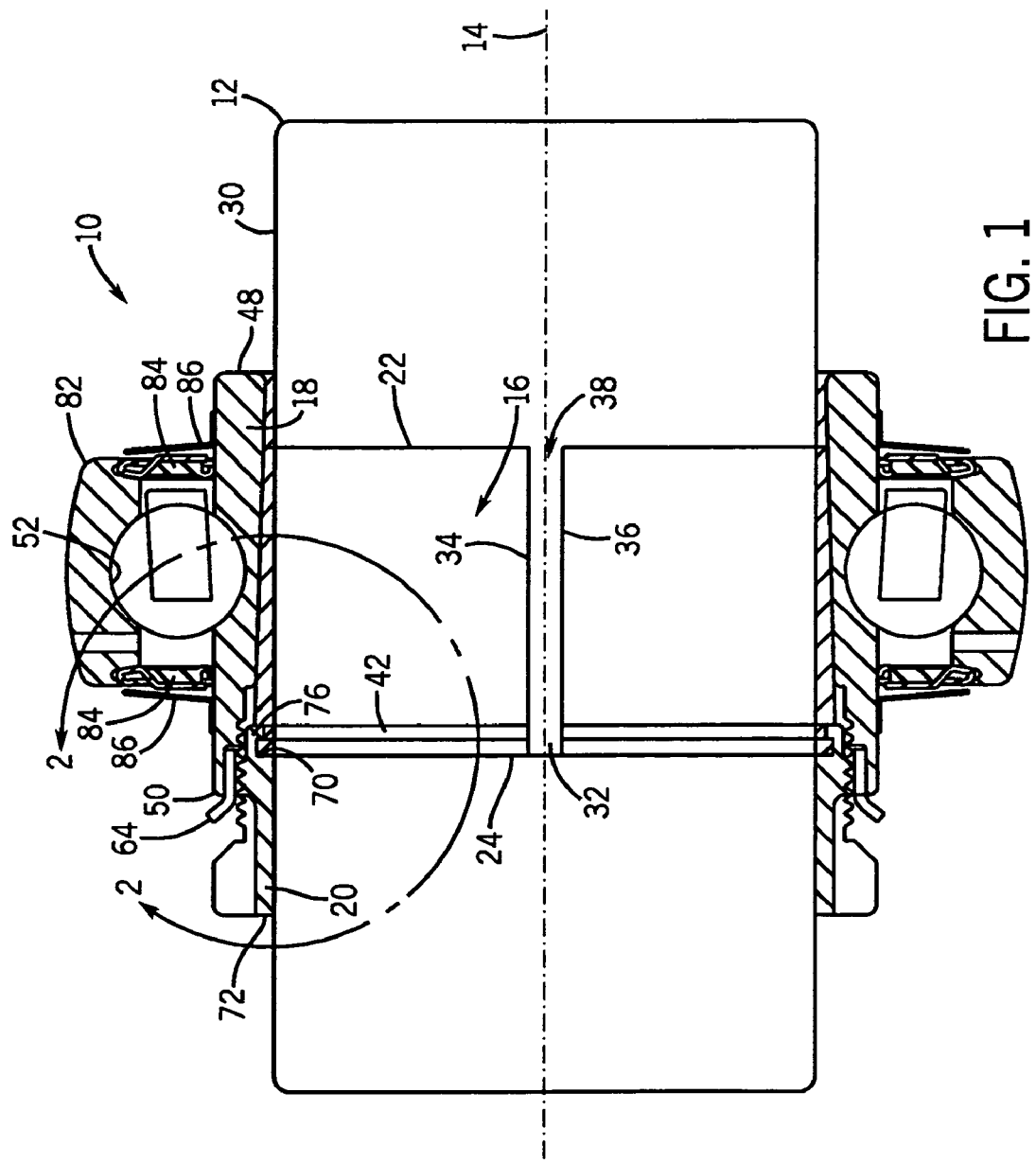
FIG. 1 is a cross sectional view of a shaft mounted bearing assembly incorporating the present invention.
Figure 2:
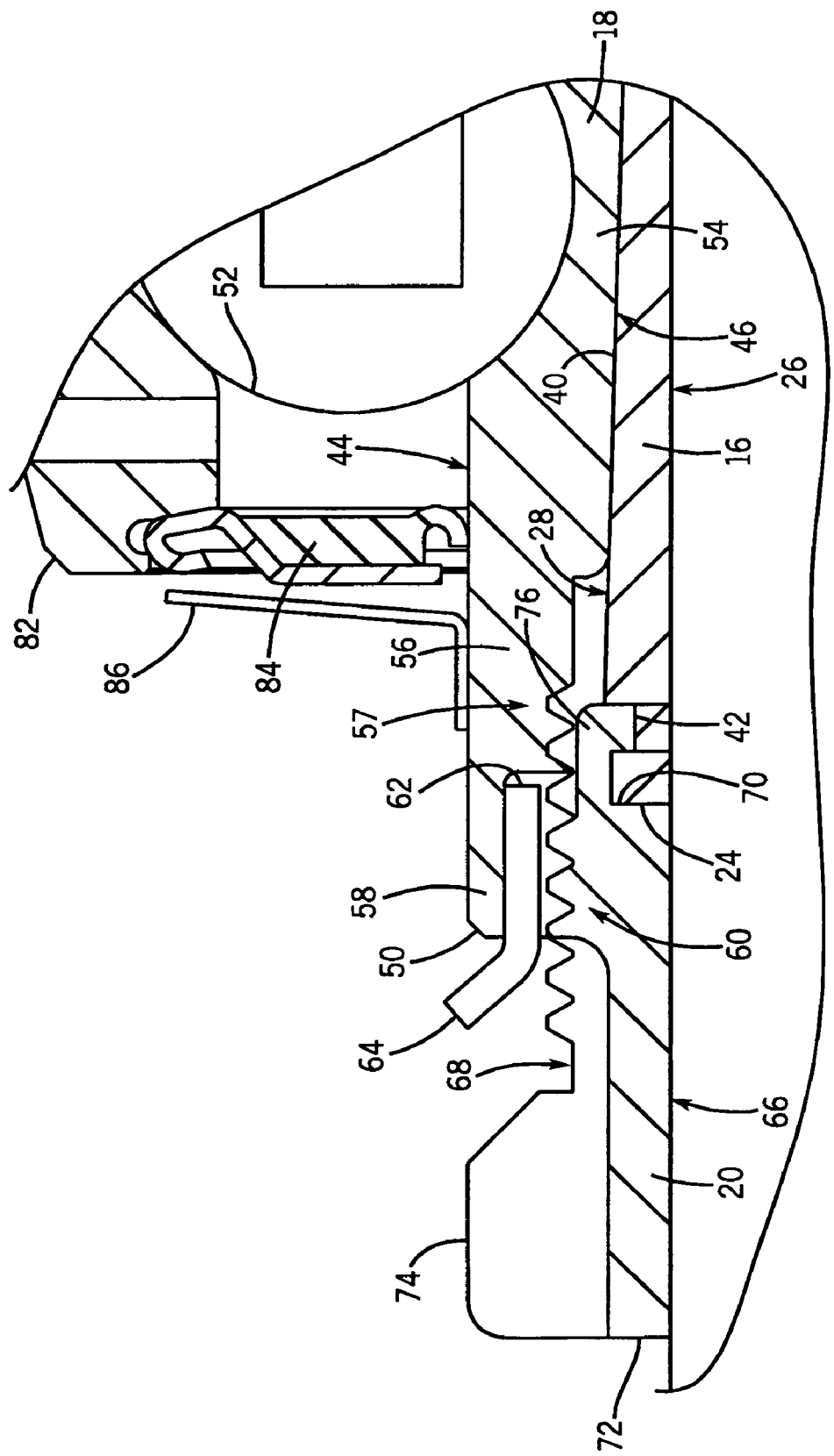
FIG. 2 is a detailed sectional view along line 2—2 of FIG. 1.

As shown in FIGS. 1 and 2, a wedge-type bearing assembly 10 is mounted on a shaft 12 having a longitudinal axis 14. The bearing assembly 10 includes an adapter sleeve 16 frictionally engaging the shaft 12, an inner ring 18 compressing the adapter sleeve 16 against the shaft 12, and a lock nut 20 axially fixed relative to the adapter sleeve 16 and engaging the inner ring 18. Rotation of the locknut 20 in a first direction of rotation draws the inner ring 18 over the adapter sleeve 16 to mount the bearing assembly 10 to the shaft 12. Rotation of the lock nut 20 in a second opposite direction of rotation pushes the inner ring 18 off of the adapter sleeve 16 to dismount the bearing assembly 10 from the shaft 12.

The cylindrical adapter sleeve 16 extends along the axis 14 of the shaft 12 between adapter sleeve first and second ends 22, 24, and has a radially inwardly facing surface 26 and a radially outwardly facing surface 28. The radially inwardly facing surface 26 defines a uniform cylindrical bore which engages the outer surface 30 of the shaft 12. A longitudinal slit 32 having slit edges 34, 36 extends the entire axial length of the sleeve 16. The slit edges 34, 36 define a gap 38 therebetween when the sleeve 16 is undeformed (i.e. not compressed by the inner ring 18) which is narrowed as the adapter sleeve 16 is radially compressed by the inner ring 18. The sleeve 16 is sized to slide over the shaft 12 when the sleeve 16 is undeformed, and the provision of the slit 32 along the sleeve 16 affords compression of the sleeve 16 into locked frictional engagement with the shaft 12 in a manner discussed below.

The radially outwardly facing surface 28 of the sleeve 16 includes a tapered section 40 engageable with the inner ring 18 and a circumferential groove 42 engageable with the lock nut 20. The tapered section 40 extends from the first end 22 of the sleeve 16 toward the second, opposite end 24 of the sleeve 16, and is frustoconical with a first relatively small diameter proximal the first end 22 of the sleeve 16. The diameter of the tapered section 40 uniformly increases toward the sleeve second end 24. Various angles of taper, such as between about 3° to 4°, can be used.

The radially outwardly opening circumferential groove 42 is formed in the radially outwardly facing surface 28 proximal the second end 24 of the adapter sleeve 16. The groove 42 rotatably slidably engages the lock nut 20 to axially fix the lock nut 20 relative to the adapter sleeve 16 while allowing the lock nut 20 to rotate relative to the adapter sleeve 16.

The inner ring 18 of the bearing assembly 10 is configured to mate with the sleeve 16 so that the bearing assembly 10 can be fixed to the shaft 12. The generally annular inner ring 18 surrounds the shaft 12, and has an axis substantially coaxial with the shaft axis 14. The inner ring 18 includes a radially outwardly facing surface 44 and a radially inwardly facing surface 46 joined by axially opposing inner ring first and second ends 48, 50. The radially outwardly facing surface 44 provides a bearing surface for rollers 52.

The radially inwardly facing surface 26 of the inner ring 18 is stepped radially outwardly to form three distinct portions 54, 56, 58. The first portion 54 has a first diameter at the first axial end 48 of the inner ring 18 and a second diameter proximal the second axial end 50. The first diameter is smaller than the second diameter to form a tapered bore extending through the inner ring 18 between the axial ends 48, 50 of the inner ring 18. Preferably, the radially inwardly facing surface first portion 54 of the inner ring 18 lies at an angle relative to the axis 14 which approximates the angle of the tapered section 40 of the sleeve 16. When the inner ring 18 is drawn over the adapter sleeve 16, the tapered section 40 of the sleeve 16 slides along and engages the first portion 54 of the radially inwardly facing surface 26 of the inner ring 18 to compress the adapter sleeve 16 against the shaft 12.

The second portion 56 of the radially inwardly facing surface 26 of the inner ring 18 is spaced radially outwardly from the first portion 54, and extends from the first portion 54 toward the second axial end 50. Internal threads 57 formed in the second portion 56 engage external threads 60 formed in the lock nut 20.

The third portion 58 of the radially inwardly facing surface 26 of the inner ring 18 is spaced radially outwardly from the second portion 56, and extends from the second portion 56 toward the inner ring second axial end 50 over the circumferential groove 42 of the adapter sleeve 16. The third portion 58 defines a gap 62 between the inner ring 18 and the lock nut 20 for receiving a lock washer 64 that locks the lock nut 20 relative to the inner ring 18.

The cylindrical lock nut 20 engages both the adapter sleeve 16 and inner ring 18 to move the inner ring 18 relative to the adapter sleeve 16 in either axial direction. The lock nut 20 includes a radially inwardly facing surface 66 and a radially outwardly facing surface 68, both of which extend between first and second lock nut ends 70, 72. The radially inwardly facing surface 66 defines a uniform cylindrical bore that engages the outer surface of the shaft 12.

The radially outwardly facing surface 68 of the lock nut 20 includes flats 74 and the external threads 60. The external threads 60 are formed in the radially outwardly facing surface 68 proximal the lock nut first end 70, and threadably engage the internal threads 57 formed in the second portion 56 of the radially inwardly facing surface 26 of the inner ring 18. The flats 74 are spaced circumferentially on the radially outwardly facing surface 68 of the lock nut 20 proximal the lock nut second end 72, and are engageable with a wrench to rotate the lock nut 20 relative to the inner ring 18 and adapter sleeve 16 to threadably engage the internal threads 57 formed in the inner ring 18 and axially move the inner ring 18 relative to the adapter sleeve 16 in either axial direction.

A radially inwardly depending hook 76 extends from the first end 70 of the lock nut 20. The hook 76 extends over the second end 24 of the adapter sleeve 16 beneath the third portion 58 of the inner ring 18 to engage the circumferential groove 42 and axially fix the lock nut 20 relative to the adapter sleeve 16. Advantageously, the hook 76 fixes the lock nut 20 axially relative to the adapter sleeve 16 while allowing the lock nut 20 to rotate and threadably engage the inner ring 18. Although an inwardly depending hook is disclosed, other structure that fixes the lock nut axially relative to the adapter sleeve while allowing the lock nut to rotate can be provided, such as a radially outwardly depending hook that engages a radially inwardly opening groove, and the like, without departing from the scope of the invention. Moreover, if a hook engaging a circumferential groove is used, the hook can form part of the adapter sleeve and the circumferential groove can be formed in the lock nut without departing from the scope of the invention.

Figure 3:
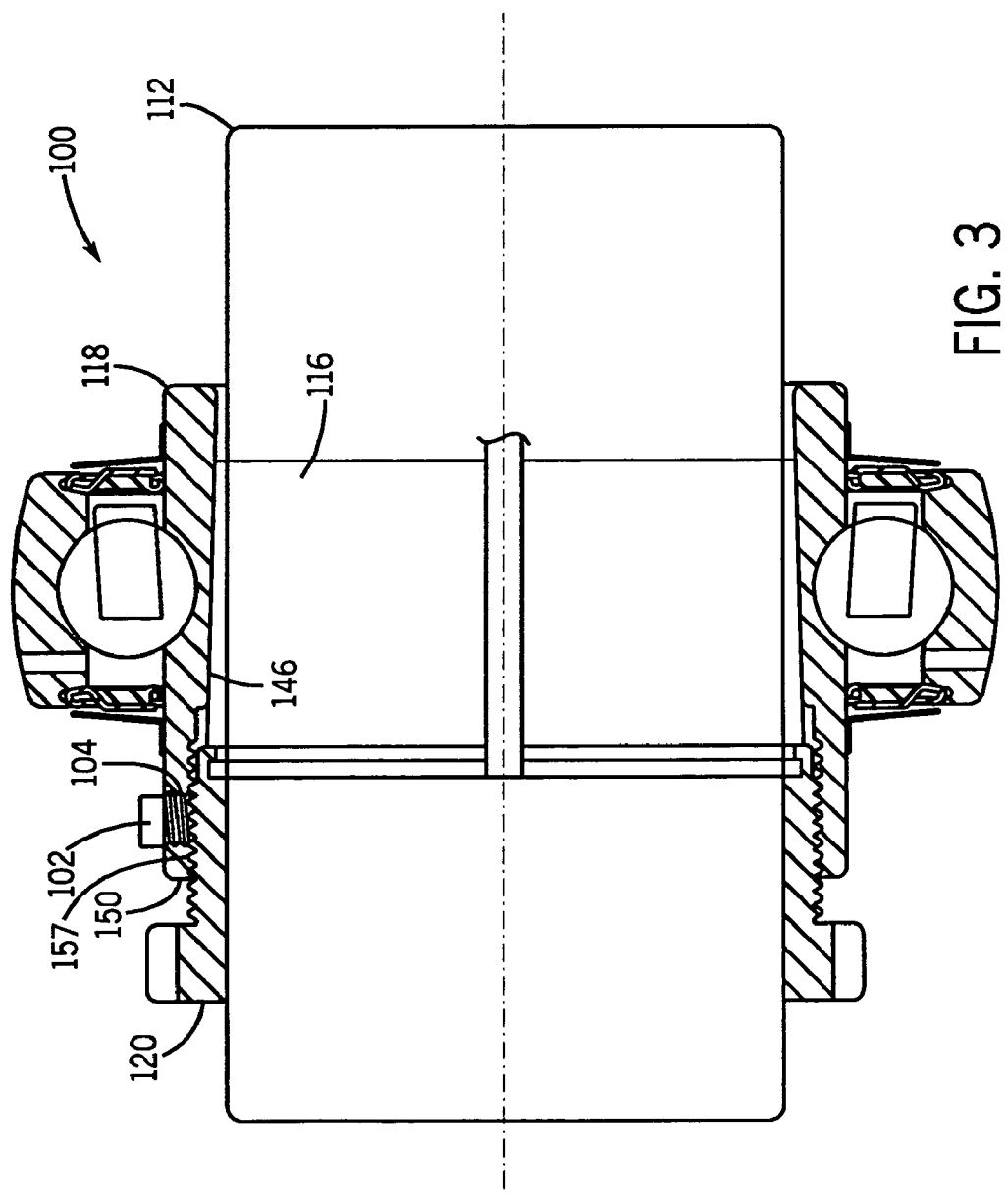
FIG. 3 is a cross sectional view of an alternative shaft mounted bearing assembly incorporating the present invention.

The lock washer 64 can be provided which is received in the gap 62 between the inner ring 18 and lock nut 20 to rotatably fix the lock nut 20 relative to the inner ring 18, and prevent unintended rotation of the lock nut 20 relative to the inner ring 18. Although locking structure, such as the lock washer is preferred, locking structure can be omitted without departing from the scope of the invention. Moreover, alternative locking structure, such as shown in FIG. 3, and described below, can be used without departing from the scope of the invention.

The bearing assembly 10 further includes an outer ring 82 radially spaced from the inner ring 18 to sandwich the plurality of rollers 52 therebetween. The rollers 52 allow the rings 18, 82 to move relative to each other. The term "roller" used herein can be any roller used in the art, such as ball bearings, cylindrical rollers, tapered rollers, and the like, that allow relative movement of the inner and outer rings 18, 82. A retainer ring (not shown) can be provided to space the rollers 52 between the inner and outer rings 18, 82.

Seal rings 84 extending between the inner and outer rings 18, 82 on opposing sides of the rollers 52 seal lubricant around the rollers 52. Seal guards 86 fixed to the inner ring 18 and covering the seal rings 84 can be provided to protect the seal rings 84 from contamination. A housing (not shown) can also be provided that surrounds the inner ring 18 and rollers 52 and is fixed relative to the outer ring 82 without departing from the scope of the invention.

In use, the bearing assembly 10 is mounted on the shaft 12 by compressing the adapter sleeve 16 to engage the lock nut hook 76 in the circumferential groove 42 of the adapter sleeve 16. The adapter sleeve 16 and lock nut 20 are then slipped axially onto the shaft 12. The inner ring 18, along with the rollers 52 and outer ring 82 are then slipped axially onto the shaft 12, such that the first portion 54 of the radially inwardly facing surface 26 of the inner ring 18 forming the tapered bore mates with the tapered section 40 of the radially outwardly facing surface 28 of the adapter sleeve 16. The inner ring 18 is slipped axially along the adapter sleeve 16 until the internal threads 57 of the inner ring 18 threadably engage the external threads 60 of the lock nut 20.

The lock washer 64 is then slipped into the gap 62 between the third portion 58 of the inner ring radially inwardly facing surface 26 and the lock nut 20. The lock nut 20 is then rotated in the first direction to draw the inner ring 18 toward the lock nut 20. As the tapered section 40 of the adapter sleeve 16 and the tapered bore of the inner ring 18 become wedged together, the sleeve 16 compresses and the gap 38 defined by the slit edges 34, 36 narrow until the sleeve 16 is frictionally locked with the shaft 12 or until the a sufficient amount of torque is applied to the lock nut 20. Advantageously, the lock washer 64 locks the inner ring 18 relative to the lock washer 64 to prevent movement of the inner ring 18 relative to the adapter sleeve 16.

The bearing assembly 10 is dismounted from the shaft 12 by rotating the lock nut 20 in the second direction opposite to the first direction of rotation. Rotating the lock nut 20 in the second direction urges the inner ring 18 axially off of the adapter sleeve 16 to unwedge the tapered section 40 of the adapter sleeve 16 and the tapered bore of the inner ring 18. As the inner ring 18 is urged axially off of the adapter sleeve 16, the adapter sleeve 16 expands to release its grip on the shaft 12.

In an alternative construction shown in FIG. 3, the bearing assembly 100 includes an adapter sleeve 116 compressed onto a shaft 112 by an inner ring 118 urged over the adapter sleeve 116 by a lock nut 120. The inner ring 118 has a radially inwardly facing surface 146 including a tapered bore, such as described above, and internal threads 157. The tapered bore of the inner ring 118 slidably engages the adapter sleeve 116 to compress the adapter sleeve 116 against the shaft 112. The internal threads 157 extend from the tapered bore to the second axial end 150 of the inner ring 118 and threadably engage the lock nut 120 to urge the inner ring 118 over the adapter sleeve 116.

In the embodiment disclosed in FIG. 3, locking structure including a radially extending threaded aperture 104 formed through the inner ring 118 threadably receives a radially extending set screw 102 which impinges on the lock nut 120 to fix the lock nut 120 relative to the inner ring 118. The radially extending set screw 102 locks the lock nut 120 relative to the inner ring 118.

Figure 4:
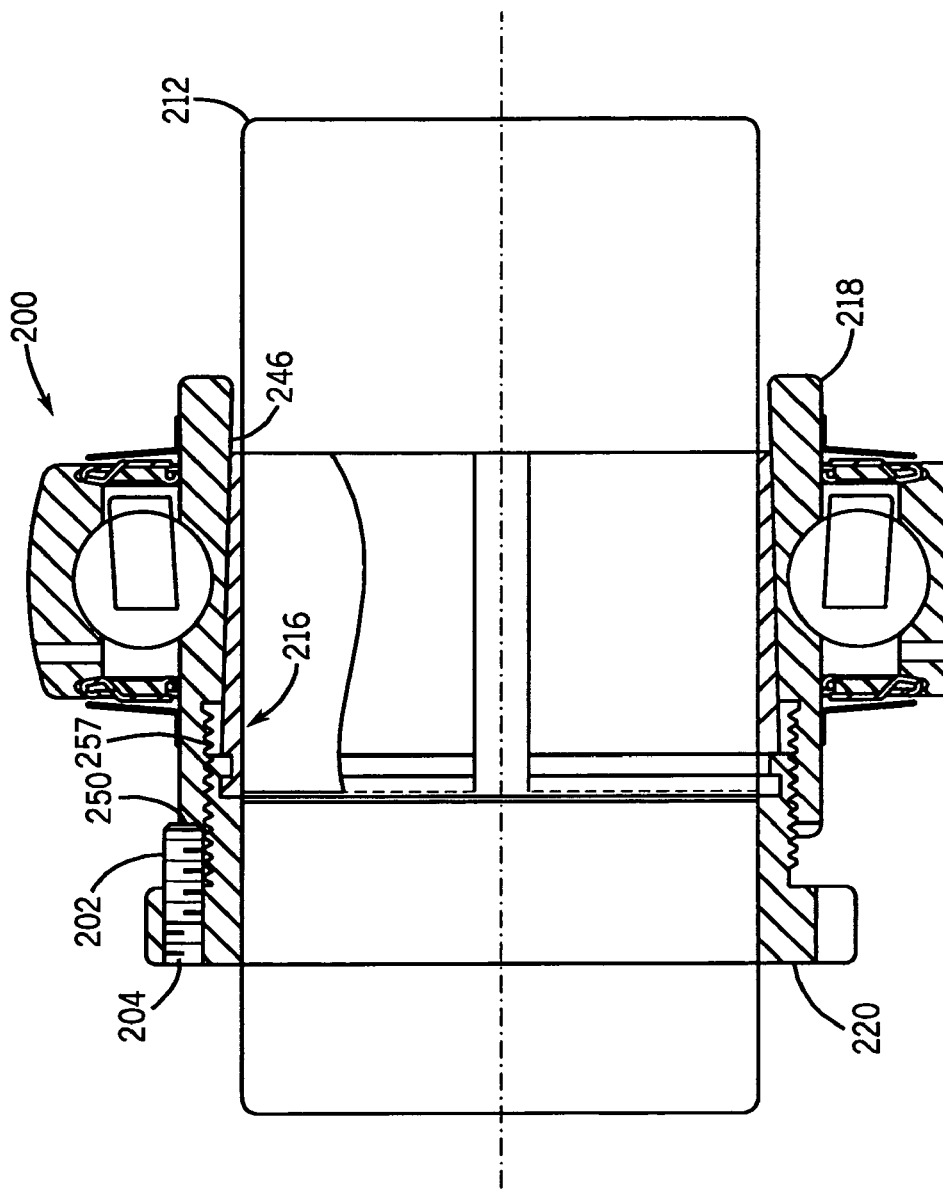
FIG. 4 is a cross sectional view of another alternative shaft mounted bearing assembly incorporating the present invention.

In another alternative construction shown in FIG. 4, the bearing assembly 200 includes an adapter sleeve 216 compressed onto a shaft 212 by an inner ring 218 urged over the adapter sleeve 216 by a lock nut 220. The inner ring 218 has a radially inwardly facing surface 246 including a tapered bore, such as described above, and internal threads 257. The tapered bore of the inner ring 218 slidably engages the adapter sleeve 216 to compress the adapter sleeve 216 against the shaft 212. The internal threads 257 extend from the tapered bore to the second axial end 250 of the inner ring 218 and threadably engage the lock nut 220 to urge the inner ring 218 over the adapter sleeve 216.

In the embodiment disclosed in FIG. 4, locking structure including an axially extending threaded aperture 204 formed through the lock nut 220 threadably receives a set screw 202 which impinges on the second axial end 250 of the inner ring 218 to fix the lock nut 220 relative to the inner ring 218. The radially extending set screw 202 locks the lock nut 220 relative to the inner ring 218.

While there have been shown and described what is at present considered the preferred embodiments of the invention, it will be obvious to those skilled in the art that various changes and modifications can be made therein without departing from the scope of the invention defined by the appended claims. For example, the inner sleeve can have external threads that threadably engage internal threads of the lock nut.

I claim:

1. A bearing assembly comprising:
   a split cylindrical adapter sleeve for wrapping around a shaft, said sleeve having a radially outwardly facing surface including a radially outwardly opening circumferential groove formed at one axial end of said sleeve and a tapered section extending from said circumferential groove toward an opposing axial end of said sleeve, said tapered section having a first diameter proximal said circumferential groove which is greater than a second diameter proximal said opposing axial end of said sleeve;
   an inner ring encircling said adapter sleeve and having a radially inwardly facing surface between axial ends of said inner ring engaging said tapered section of said adapter sleeve, said inner ring including inner threads formed in said radially inwardly facing surface proximal one of said axial ends of said inner ring; and
   a lock nut encircling the shaft and having a radially inwardly depending hook engaging said circumferential groove, and having a radially outwardly facing surface including outer threads threadably engaging said inner threads formed in said radially inwardly facing surface of said inner ring, wherein rotation of said lock nut in one direction of rotation draws said inner ring over said adapter sleeve to compress said adapter sleeve and fix said inner bearing ring relative to the shaft, and rotation of said lock nut in a second direction urges said inner ring off of said adapter sleeve to allow expansion of the adapter sleeve and release said inner bearing ring relative to the shaft.

2. The bearing assembly, as in claim 1, in which said radially inwardly facing surface of said inner ring defines a tapered bore that mates with said tapered section of said adapter sleeve.

3. The bearing assembly, as in claim 1, in which said inner threads of said inner ring extend axially past said circumferential groove.

4. The bearing assembly as in claim 1, including an outer ring radially spaced from said inner ring, said inner and outer rings sandwiching a plurality of rollers therebetween.

5. The bearing assembly as in claim 1, in which locking structure locks said lock nut relative to said inner ring to prevent unintended rotation of said lock nut relative to said inner ring.

6. The bearing assembly as in claim 5, in which said locking structure includes a lock washer interposed between said lock nut and said inner ring.

7. The bearing assembly as in claim 5, in which said locking structure includes a set screw threadably engaging at least one of said inner ring and said lock nut and impinging upon the other of said inner ring and said lock nut.

8. A bearing assembly comprising:
   a split cylindrical adapter sleeve for wrapping around a shaft, said sleeve having a radially outwardly facing surface including a tapered section;
   a threaded inner ring encircling said adapter sleeve, and including a radially inwardly facing surface engaging said tapered section of said adapter sleeve; and
   a lock nut fixed axially relative to said adapter sleeve and threadably engaging said inner ring, wherein rotation of said lock nut in one direction of rotation draws said inner ring over said adapter sleeve to compress said adapter sleeve and fix said inner bearing ring relative to the shaft, and rotation of said lock nut in a second direction urges said inner ring off of said adapter sleeve to allow expansion of said adapter sleeve and release said inner bearing ring relative to the shaft.

9. The bearing assembly, as in claim 8, in which said radially inwardly facing surface of said inner ring defines a tapered bore that mates with said tapered section of said adapter sleeve.

10. The bearing assembly, as in claim 8, in which said inner threads of said inner ring extend axially past said circumferential groove.

11. The bearing assembly as in claim 8, including an outer ring radially spaced from said inner ring, said inner and outer rings sandwiching a plurality of rollers therebetween.

12. The bearing assembly as in claim 8, in which locking structure locks said lock nut relative to said inner ring to prevent unintended rotation of said lock nut relative to said inner ring.

13. The bearing assembly as in claim 12, in which said locking structure includes a lock washer interposed between said lock nut and said inner ring.

14. The bearing assembly as in claim 12, in which said locking structure includes a set screw threadably engaging at least one of said inner ring and said lock nut and impinging upon the other of said inner ring and said lock nut.

15. The bearing assembly, as in claim 8, in which said threaded inner ring includes internal threads formed in said radially inwardly facing surface which threadably engage external threads formed in a radially outwardly facing surface of said lock nut.

16. The bearing assembly as in claim 8, in which said lock nut is fixed axially relative to said adapter sleeve by a hook extending from one of said adapter sleeve and said lock nut that engages a circumferential groove formed in the other of said adapter sleeve and said lock nut.

17. A bearing assembly comprising:
- a split cylindrical adapter sleeve for wrapping around a shaft, said sleeve having a radially outwardly facing surface including a radially outwardly opening circumferential groove formed at one axial end of said sleeve and a tapered section extending from said circumferential groove toward an opposing axial end of said sleeve, said tapered section having a first diameter proximal said circumferential groove which is greater than a second diameter proximal said opposing axial end of said sleeve;
- an inner ring encircling said adapter sleeve and having a radially inwardly facing surface between axial ends of said inner ring, said radially inwardly facing surface of said inner ring defining a tapered bore mating with said tapered section of said adapter sleeve, said inner ring including inner threads formed in said radially inwardly facing surface proximal one of said axial ends of said inner ring;
- an outer ring radially spaced from said inner ring;
- a plurality of rollers interposed between said inner and outer rings;
- a lock nut encircling the shaft and having a radially inwardly depending lip engaging said circumferential groove, and having a radially outwardly facing surface including outer threads threadably engaging said inner threads formed in said radially inwardly facing surface of said inner ring, wherein rotation of said lock nut in one direction of rotation draws said inner ring over said adapter sleeve to compress said adapter sleeve and fix said inner bearing ring relative to the shaft, and rotation of said lock nut in a second direction urges said inner ring off of said adapter sleeve to allow expansion of the adapter sleeve and release said inner bearing ring relative to the shaft; and
- locking structure engaging said lock nut and said inner ring which locks said lock nut relative to said inner ring to prevent unintended rotation of said lock nut relative to said inner ring.

18. The bearing assembly, as in claim 17, in which said inner threads of said inner ring extend axially past said circumferential groove.

19. The bearing assembly as in claim 17, in which said locking structure includes a lock washer interposed between said lock nut and said inner ring.

20. The bearing assembly as in claim 17, in which said locking structure includes a set screw threadably engaging at least one of said inner ring and said lock nut and impinging upon the other of said inner ring and said lock nut.

* * * * *